United States Patent
Kharvar et al.

(10) Patent No.: US 10,880,807 B2
(45) Date of Patent: Dec. 29, 2020

(54) BATTERY EFFICIENT ROUTING IN MESH NETWORKS

(71) Applicant: QUALCOMM incorporated, San Diego, CA (US)

(72) Inventors: Chirag Manojkumar Kharvar, Bangalore (IN); Sourabh Jana, Bangalore (IN); Skanda Kumar Kaipu Narahari, Banashankari (IN)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/294,260

(22) Filed: Mar. 6, 2019

(65) Prior Publication Data

US 2020/0288373 A1   Sep. 10, 2020

(51) Int. Cl.
| | |
|---|---|
| *H04W 40/10* | (2009.01) |
| *H04W 40/30* | (2009.01) |
| *H04B 17/318* | (2015.01) |
| *H04W 40/12* | (2009.01) |
| *H04W 84/18* | (2009.01) |

(52) U.S. Cl.
CPC .......... *H04W 40/10* (2013.01); *H04B 17/318* (2015.01); *H04W 40/12* (2013.01); *H04W 40/30* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2009/0010190 A1* | 1/2009 | Gong | H04W 40/22 370/311 |
| 2011/0194472 A1* | 8/2011 | Bahr | H04W 40/005 370/311 |
| 2017/0245096 A1* | 8/2017 | Baroudi | H04L 41/0803 |
| 2020/0037333 A1* | 1/2020 | Chen | H04L 45/123 |

* cited by examiner

*Primary Examiner* — Christine T Duong
(74) *Attorney, Agent, or Firm* — Holland & Hart LLP/Qualcomm (57) ABSTRACT

A device in a mesh network may select a relay path for use based on the power resources available to the devices forming the relay path. For example, if there are multiple relay paths available for selection, the device may choose a relay path that has the lowest quantity of devices that are operating on battery power. The device may determine the quantity of battery-powered devices associated with a path based on power information included in one or more messages received from one of the devices forming the path. After selecting the relay path, the device may transmit a response message to an intermediary device forming the relay path. The intermediary device may, in some examples, be a device that transmitted a message including the power information.

20 Claims, 8 Drawing Sheets

BATTERY EFFICIENT ROUTING IN MESH NETWORKS

BACKGROUND

The following relates generally to wireless communications, and more specifically to battery efficient routing in mesh networks.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a device to communicate via the network (or communicate with other devices coupled to the access point). A device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more devices.

In some cases, devices that are capable of communicating directly (e.g., via Bluetooth) may form a mesh network to extend the range of communications. In a mesh network, content from one device may be delivered to another device via a relay system in which the content is forwarded by other mobile devices in the mesh network. But often, the devices selected to be part of the relay path have limited resources. Techniques for selecting appropriate devices for a relay path may be desired.

SUMMARY

The described techniques relate to improved methods, systems, devices, or apparatuses that support efficient routing in mesh networks. A device in a mesh network may select a relay path for use based on various factors, including but not limited to the power resources available to the devices forming the relay path. For example, if there are multiple relay paths available for selection, the device may choose the relay path that has the lowest quantity of devices that are operating on battery power, among other factors. The device may determine the quantity of battery-powered devices associated with a path based on power information included in a message received (e.g., from one of the devices forming the path or from a device from a different path). After selecting the relay path, the device may transmit a response message to a second device, such as an intermediary device in the relay path. The intermediary device may, in some cases, be the device that transmitted the message including the power information.

A method for wireless communication at a first wireless device in a wireless mesh network is described. The method may include receiving messages from wireless devices within the wireless mesh network, each of the messages comprising a value indicating a quantity of wireless devices that relayed the message while operating using a respective battery source; determining, based at least in part on the messages, that a second wireless device transmitted a first message with a value that corresponds to the lowest quantity of wireless devices that relayed that message while operating using the respective battery source; and transmitting a second message over a path that includes the second wireless device based at least in part on the determination.

A first wireless device for communicating in a wireless mesh network is described. The first wireless device may include a processor, memory in electronic communication with the processor, and instructions stored in the memory. The instructions may be executable by the processor to cause the first wireless device to receive messages from wireless devices within the wireless mesh network, each of the messages comprising a value indicating a quantity of wireless devices that relayed the message while operating using a respective battery source; determine, based at least in part on the messages, that a second wireless device transmitted a first message with a value that corresponds to the lowest quantity of wireless devices that relayed that message while operating using the respective battery source; and transmit a second message over a path that includes the second wireless device based at least in part on the determination.

A non-transitory computer readable medium storing code comprising instructions executable by a processor is described. The instructions may be executable by the processor to cause a first wireless device in a wireless mesh network to receive messages from wireless devices within the wireless mesh network, each of the messages comprising a value indicating a quantity of wireless devices that relayed the message while operating using a respective battery source; determine, based at least in part on the messages, that a second wireless device transmitted a first message with a value that corresponds to the lowest quantity of wireless devices that relayed that message while operating using the respective battery source; and transmit a second message over a path that includes the second wireless device based at least in part on the determination.

Some examples of the method, apparatuses, and non-transitory computer-readable medium described herein may further include operations, features, means, or instructions for determining, based at least in part on the first message, a quantity of wireless devices that are part of the path, wherein the second message is transmitted over the path based at least in part on the quantity of devices that are part of the path.

Some examples of the method, apparatuses, and non-transitory computer-readable medium described herein may further include operations, features, means, or instructions for determining, based at least in part on the first message, a received signal strength indicator (RSSI) associated with the path, wherein the second message is transmitted over the path based at least in part on the RSSI.

Some examples of the method, apparatuses, and non-transitory computer-readable medium described herein may further include operations, features, means, or instructions for determining, based at least in part on the first message, a level of battery power for a quantity of wireless devices that are part of the path, wherein the second message is transmitted over the path based at least in part on the level.

Some examples of the method, apparatuses, and non-transitory computer-readable medium described herein may further include operations, features, means, or instructions for determining that a third message from a third wireless device of the wireless devices comprises the value that corresponds to the lowest quantity of wireless devices that relayed the third message while operating using the respective battery source; comparing a second metric of the first and third messages, the second metric indicative of a total quantity of wireless devices, an RSSI, or a level of battery power, or any combination thereof; and selecting the path for transmission of the second message based at least in part on the comparison.

In some examples of the method, apparatuses, and non-transitory computer-readable medium described herein, the first message is a path request (PREQ) message. Thus, some examples of the method, apparatuses, and non-transitory computer-readable medium described herein may further include operations, features, means, or instructions for incrementing the value of the first message; forwarding the PREQ message with the incremented value to a third wireless device; and receiving a first path reply (PREP) message from the third wireless device, wherein transmitting the second message comprises transmitting a second PREP message by forwarding the first PREP message.

In some examples of the method, apparatuses, and non-transitory computer-readable medium described herein, the messages comprise PREQ messages and the second message comprises a path reply (PREP) message. Thus, some examples of the method, apparatuses, and non-transitory computer-readable medium described herein may further include operations, features, means, or instructions for receiving data from the second wireless device based at least in part on sending the PREP message to the second wireless device, wherein the data originates from a wireless device other than the second wireless device.

Some examples of the method, apparatuses, and non-transitory computer-readable medium described herein may further include operations, features, means, or instructions for determining that the value of the first message indicates the quantity of wireless devices using the respective battery source based at least in part on an indication in the first message.

DETAILED DESCRIPTION

A device may select another device as part of a relay path based on, among other factors, the power resources available to the devices forming the relay path. For example, when presented with two possible paths for a relay, a device may choose the path that has the fewest battery-powered devices. A battery-powered device may be a device that operates exclusively using an internal, finite power source (e.g., as opposed to a device, such as a wall-powered device, that is powered by an external source, such as a power outlet).

In some mesh networks (e.g., Bluetooth SIG Mesh networks), a device that has data for another device in the mesh may implement directed forwarding (DF). In directed forwarding, devices in a mesh network communicate one or more messages (e.g., path request (PREQ) and path response (PREP) messages) to set up a relay path from the source device to the destination device. The devices that form the relay path may be selected based on parameters such as received signal strength indication (RSSI) and hop count.

But selecting relay devices based on these limited parameters alone may have certain disadvantages. For example, some devices forming the relay path may be mobile battery-powered device that do not have access to external power sources. Using such devices to relay messages may drain the devices' batteries, or may result in an broken path if one of the devices changes location before it serves as a relay in the path. A broken path may not only interfere with communication between the source and destination devices, but also increase network congestion and latency as additional communications occur to establish another path.

Figure 1:
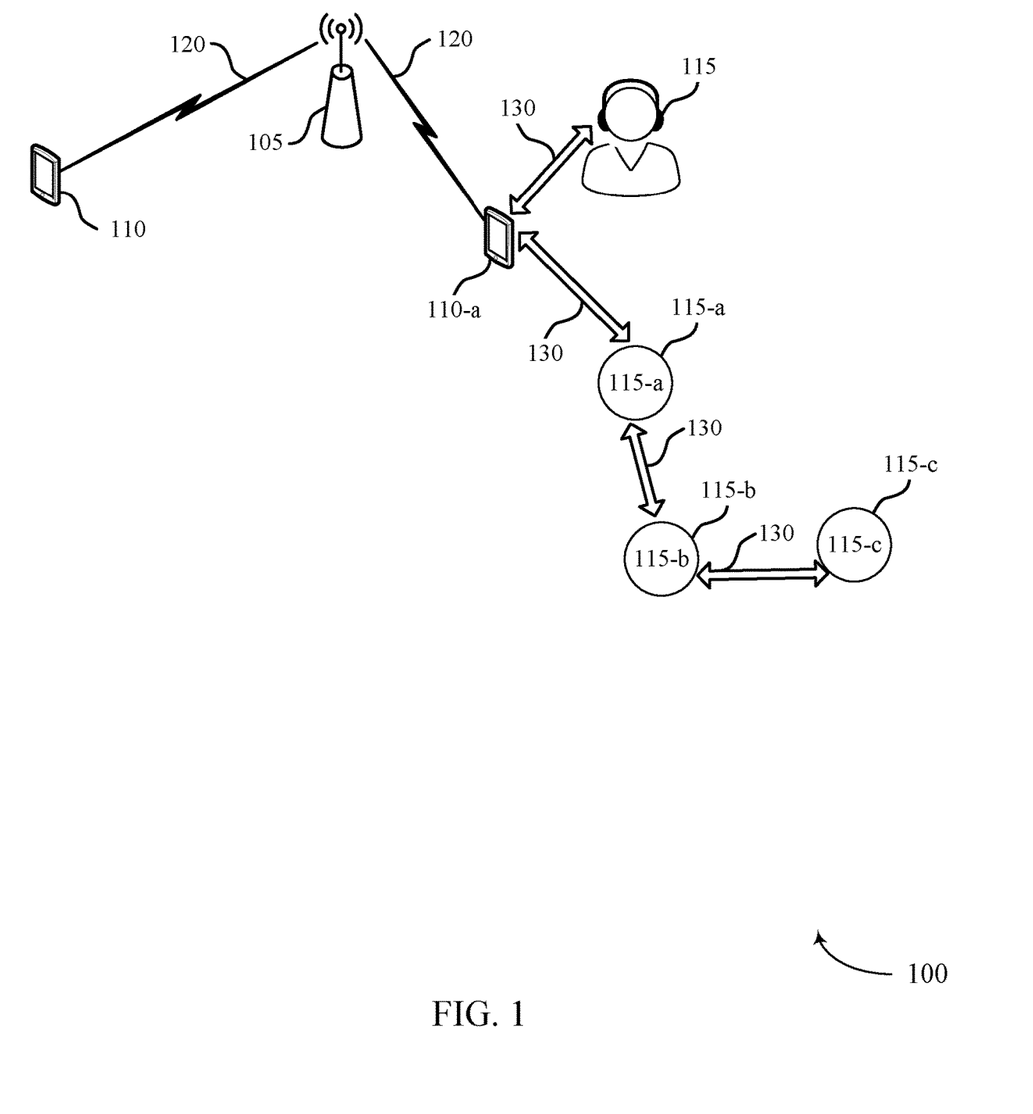
FIG. 1 illustrates a system that supports power efficient routing in a mesh network in accordance with various aspects of the present disclosure.

FIG. 1 illustrates a system 100 (e.g., which may include or refer to a wireless personal area network (PAN), a wireless local area network (WLAN), a Wi-Fi network) configured in accordance with various aspects of the present disclosure. The system 100 may include an AP 105, stations (STAs) 110, and wireless devices 115 implementing WLAN communications (e.g., Wi-Fi communications) and/or Bluetooth communications. For example, STAs 110 may include cell phones, mobile stations, personal digital assistant (PDAs), other handheld devices, netbooks, notebook computers, tablet computers, laptops, or some other suitable terminology.

Wireless devices 115 may include Bluetooth devices capable of pairing (e.g., independent of AP 105) with other Bluetooth devices (e.g., such as STAs 110), which may include wireless headsets, speakers, ear pieces, headphones, display devices (e.g., TVs, computer monitors), microphones, meters, valves, etc. Wireless devices 115 may be stationary (e.g., fixed in a particular location) or mobile (allowed to move about), and may be powered by external sources (e.g., a charging station) and/or internal sources. When a device is powered exclusively by internal or mobile power sources (e.g., one or more batteries or power-storage components), the devices may be referred to as battery-powered or power-limited devices. Thus, a battery-powered device may be disconnected from (e.g., isolated from) external or stationary power sources.

Bluetooth communications may refer to a short-range communication protocol and may be used to connect and exchange information between STAs 110 and wireless devices 115 (e.g., between mobile phones, computers, digital cameras, wireless headsets, speakers, keyboards, mice or other input peripherals, and similar devices). Bluetooth systems (e.g., aspects of system 100) may be organized using a master-slave relationship employing a time division duplex protocol having, for example, defined time slots of 625 mu secs, in which transmission alternates between the master device (e.g., a STA 110) and one or more slave devices (e.g., wireless devices 115). In some cases, a STA 110 may generally refer to a master device, and a wireless device 115 may refer to a slave device in a PAN. As such, in some cases, a device may be referred to as either a STA 110 or a wireless device 115 based on the Bluetooth role configuration of the device. That is, designation of a device as either a STA 110 or a wireless device 115 may not necessarily indicate a distinction in device capability, but rather may refer to or indicate roles held by the device in the PAN. Generally, STA 110 may refer to a wireless communication device capable of wirelessly exchanging data signals with an AP 105, and wireless device 115 may refer to a short-range wireless device capable of exchanging data signals with other devices (e.g., using Bluetooth communication protocols).

A Bluetooth device (e.g., a STA 110 or wireless device 115) may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., STA 110-$a$) implements an audio source device (SRC) role and another device (e.g., wireless device 115-$a$) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor.

The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., wireless device 115-$a$) are acknowledged, and may be retransmitted if not acknowledged during a retransmission window. In addition, audio may be streamed between the STA 110-$a$ and wireless device 115-$a$ using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a STA 110 may support WLAN communications via AP 105 (e.g., over communication links 120). The AP 105 and the associated STAs 110 may represent a basic service set (BSS) or an extended service set (ESS). The various STAs 110 in the network may be able to communicate with one another through the AP 105, In some cases the AP 105 may be associated with a coverage area, which may represent a basic service area (BSA).

STAs 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. AP 105 may be coupled to a network, such as the Internet, and may enable a STA 110 to communicate via the network (or communicate with other STAs 110 coupled to the AP 105). A STA 110 may communicate with a network device bi-directionally. For example, in a WLAN, a STA 110 may communicate with an associated AP 105 via downlink (e.g., the communication link from the AP 105 to the STA 110) and uplink (e.g., the communication link from the STA 110 to the AP 105).

In some examples, content, media, audio, etc. exchanged between a STA 110 and a wireless device 115 may originate from a WLAN. For example, in some cases, STA 110-a may receive audio from an AP 105 (e.g., via WLAN communications), and the STA 110-a may then implement the described techniques to relay or pass the audio to the wireless device 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In some cases, the devices in system 100 may form a mesh network in which content is relayed from one device to another until it reaches the destination device. For example, wireless device 115-a may transmit content intended for wireless device 115-c to wireless device 115-b, which may forward the content to wireless device 115-c. Such a relay system, also referred to as directed forwarding, may extend the communication range of the wireless devices 115, which would otherwise be limited to communicating with paired device within signal range. The group of devices that form a relay may be referred to as a path.

In some cases, there may be multiple paths between the device with content (referred to as the "source" or "originator" device) and the device for which the content is intended (referred to as the "destination," "termination," or "target" device). When this happens, the decision-making device (e.g., the destination device or the source device) may select one of the paths to use.

According to the techniques described herein, the decision-making device may select the path that includes the fewest number of devices that are operating exclusively on battery power (e.g., devices that are isolated from external power sources). This power-conscious selection technique may prevent the battery-powered devices from expending their limited power reserves to serve in the relay. Another advantage is that the likelihood of a broken path is reduced. Because battery-powered devices are typically mobile, they may move before the communications between the source and destination device are completed. In such a scenario, the communications can be interrupted or delayed until an alternative path is formed. Additionally, forming the new path may increase overall network congestion and latency as additional communications occur to establish the path.

Figure 2:
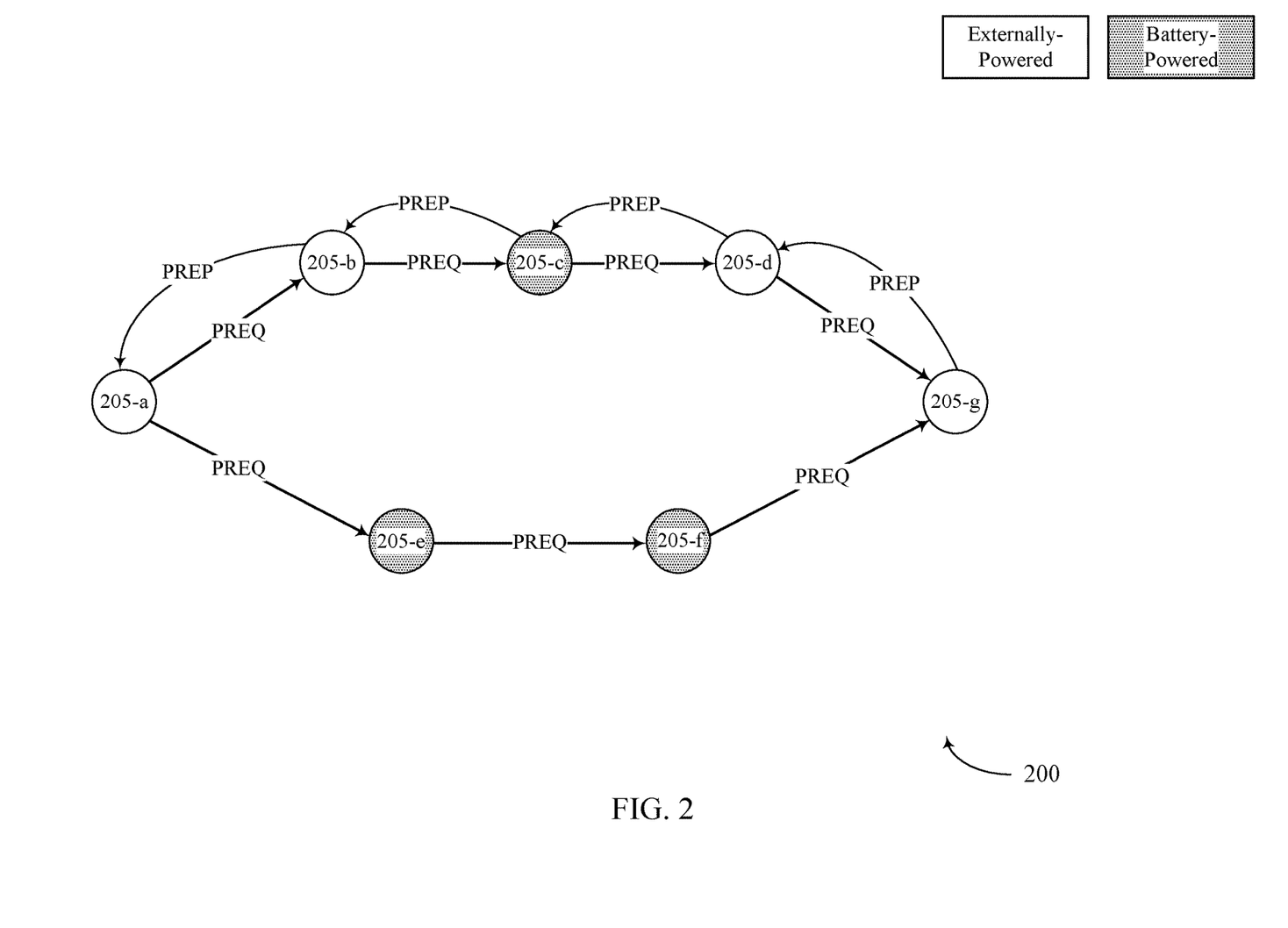
FIG. 2 illustrates a wireless communications system that supports battery efficient routing in accordance with aspects of the present disclosure.

FIG. 2 illustrates a wireless communications system 200 that supports battery efficient routing in accordance with aspects of the present disclosure. Wireless communications system 200 may be an example of a mesh network (e.g., a Bluetooth mesh network or other type of mesh network). Wireless communications system 200 may include multiple devices 205, which may be devices that are capable of peer-to-peer communications (e.g., using Bluetooth or other short-range communication techniques) For example, the devices 205 may be examples of the wireless devices 115 described with reference to FIG. 1. The devices 205 may also be referred to as nodes, and each may represent a "hop" within the mesh network. The devices 205 may include a source device 205-a, a destination device 205-g, and intermediary devices 205-b through 205-f. An intermediary device may also be referred to as a relay device. The devices 205 may include externally-powered devices, shown in white, and battery-powered devices, shown in black.

Source device 205-a may receive or determine that it has data intended for destination device 205-g. But destination device 205-g may be out of signal range of source device 205-a. Accordingly, source device 205-a may initiate a procedure for determining a relay path to destination device 205-g (e.g., via DF). As part of the procedure, source device 205-a may transmit one or more messages, such as a path request (PREQ) messages, to nearby (e.g., neighbor) devices, such as device 205-b and device 205-c. A PREQ message may, in some examples, indicate to a receiving device that it is to participate in a relay path formation process.

Included in the PREQ message may be one or more metric type fields that indicate the type of path metric(s) the devices should consider when acting as a relay node. For example, the metric type field may indicate that the devices are to obtain, store, and/or communicate information about the received signal strength indicator (RSSI) associated with the path, the hop count associated with the path (e.g., the quantity of devices associated with the path), the quantity of battery-powered devices associated with the path, and/or the remaining power of devices forming the path, among other parameters. The PREQ message may also include one or more path metric fields that represent the value(s) for the metric(s) indicated by the metric type field.

The value for the RSSI metric may represent an average RSSI for the devices that are part of a path, or the value(s) for RSSI metric may indicate the RSSI experienced by one or more of the devices. The value for the hop count metric may represent the total quantity of devices that have relayed a particular PREQ message. And the value for the remaining power metric may represent the average battery level for devices that part of the path, or the battery level for one or more of the devices.

The PREQ message may also include control information that facilitates formation of the relay path (e.g., source and destination addresses, path identifier (ID), time to live (TTL) value, Life Time value, among others). The path ID may uniquely identify the path that the originator is trying to build, the TTL value may represent the maximum number of hops the PREQ is permitted to experience, and the Time Life value may represent the maximum of time the PREQ is permitted to be relayed. The TTL and Time Life value may prevent the formation of endless loops.

Each recipient of a PREQ message may determine the relevant path metric type(s) (e.g., from the metric type field) and modify the corresponding metric value (e.g., in the path metric field(s)) as appropriate. For example, if the indicated path metric type corresponds to the quantity of battery-powered devices forming the path, the device may increment the metric value by one if it is a battery-powered device. After incrementing the metric value, the device may forward the PREQ message—with the updated metric value—to one or more neighbor devices (e.g., devices in communication with the device and within a determined range of the device). In some cases, the device may store information pertinent to the relay path (e.g., the address of the device from which the PREQ message was received, the value of the path metric(s), etc.) for later use.

In the context of FIG. 2, as one example, device 205-b and device 205-e may each receive a PREQ message from source device 205-a. The PREQ messages may indicate that the battery-power metric type (denoted BE) is of interest.

Accordingly, device 205-*b* may not increment the path metric value for battery-powered devices (because it is not a battery-powered device). However, device 205-*e* may increment the path metric value for battery-powered devices (because it is a battery-powered device). Both of the devices 205 may then forward the PREQ message with the updated path metric values to their respective neighbor devices, device 205-*c* and device 205-*f*.

Devices 205-*c* and 205-*f* may operate similar to devices 205-*b* and 205-*f*. For example, devices 205-*c* and 205-*f* may each receive a respective PREQ message, determine the path metric type(s), increment the corresponding path metric values as appropriate, and forward the updated PREQ message to neighboring devices. Because both device 205-*c* and device 205-*f* are battery-powered, both device 205-*c* and device 205-*f* may increment their respective BE path metric values before forwarding the PREQ messages.

Although device 205-*c* may forward its PREQ message to another intermediary device (e.g., device 205-*d*), device 205-*f* may forward its PREQ message to destination device 205-*g* (e.g., because there are no devices 205 between device 205-*f* and 205-*g*, or because destination device 205-*g* is within range of device 205-*f*). Like the other devices, device 205-*d* may determine the path metric type(s) and increment the corresponding path metric value(s) as appropriate before forwarding the updated PREQ message to destination device 205-*g*. Because device 205-*d* is not a battery-powered device, device 205-*d* may not increment the BE path metric value.

Thus, destination device 205-*g* may receive multiple PREQ messages, each from a different device 205 and each corresponding to a different path back to source device 205-*a*. Destination device 205-*g* may determine the path metric type(s) of interest, then select the path that is associated with the best value for that path metric type. For example, when the path metric type is BE, the destination device 205-*g* may select the path that corresponds to the value for the lowest number of battery-powered devices. So, the destination device 205-*g* may select the path that includes the fewest battery-powered devices. In the context of FIG. 2, destination device 205-*g* may select the path formed by devices 205-*b*, 205-*c*, and 205-*d* because it has fewer battery-powered devices than the path formed by device 205-*e* and 205-*f*. Thus, a path may be selected that has the fewest battery-powered devices, even though that has comparatively more devices than other paths. Such selection may prevent battery-powered devices 205-*e* and 205-*f* from expending limited power resources to serve as part of the relay. It may also reduce the likelihood that the path will be disrupted by the movement of devices 205-*e* and 205-*f*, which may be mobile devices.

After selecting the relay path, the destination device 205-*g* may transmit a PREP message to the device 205 that forms the first leg of the relay path. So, in the context of FIG. 2, destination device 205-*g* may transmit the PREP message to device 205-*d*. A PREP message may indicate to a receiving device that it has been selected as part of a relay path.

The PREP message may include control information regarding the relay path (e.g., the source and destination addresses, path ID, TTL value, Time Life value, path metric type, path metric value(s), etc.). The PREP message may be forwarded through the relay path back to the source device 205-*a*. For instance, upon receiving the PREP message, each device that is part of the selected path may forward to the next device in the path, as determined by referencing stored information that is associated with the path (e.g., each device may determine the next device in the path based on the path metric value associated with that device). Thus, device 205-*d* may relay the PREP message to device 205-*c*, device 205-*c* may relay the PREP message to device 205-*b*, and device 205-*b* may relay the PREP message to source device 205-*a*. Once the source device 205-*a* receives the PREP message from device 205-*b*, the source device may know that the relay path has been established and may transmit content intended for the destination device 205-*g* to device 205-*b*. The content will be relayed via the path to the destination device 205-*g*.

Although described with reference to a single path metric type (BE), the path selected for relay may be based on multiple path metric types (e.g., a combination of BE and hop count, or a combination of BE and RSSI, or other factors, or any combination thereof). For example, if two paths are tied with the fewest battery-powered devices, a decision-making device (e.g., destination device 205-*g*) may select the path with the lowest hop count or highest RSSI. In another example, the decision-making device may assign respective weights to the path metrics and select the path with the combination of path metrics that has the lowest or highest value. Or a decision-making device may first eliminate paths that have more battery-powered devices than a threshold quantity, then select from the remaining paths the path with the lowest hop count or highest RSSI.

Figure 3:
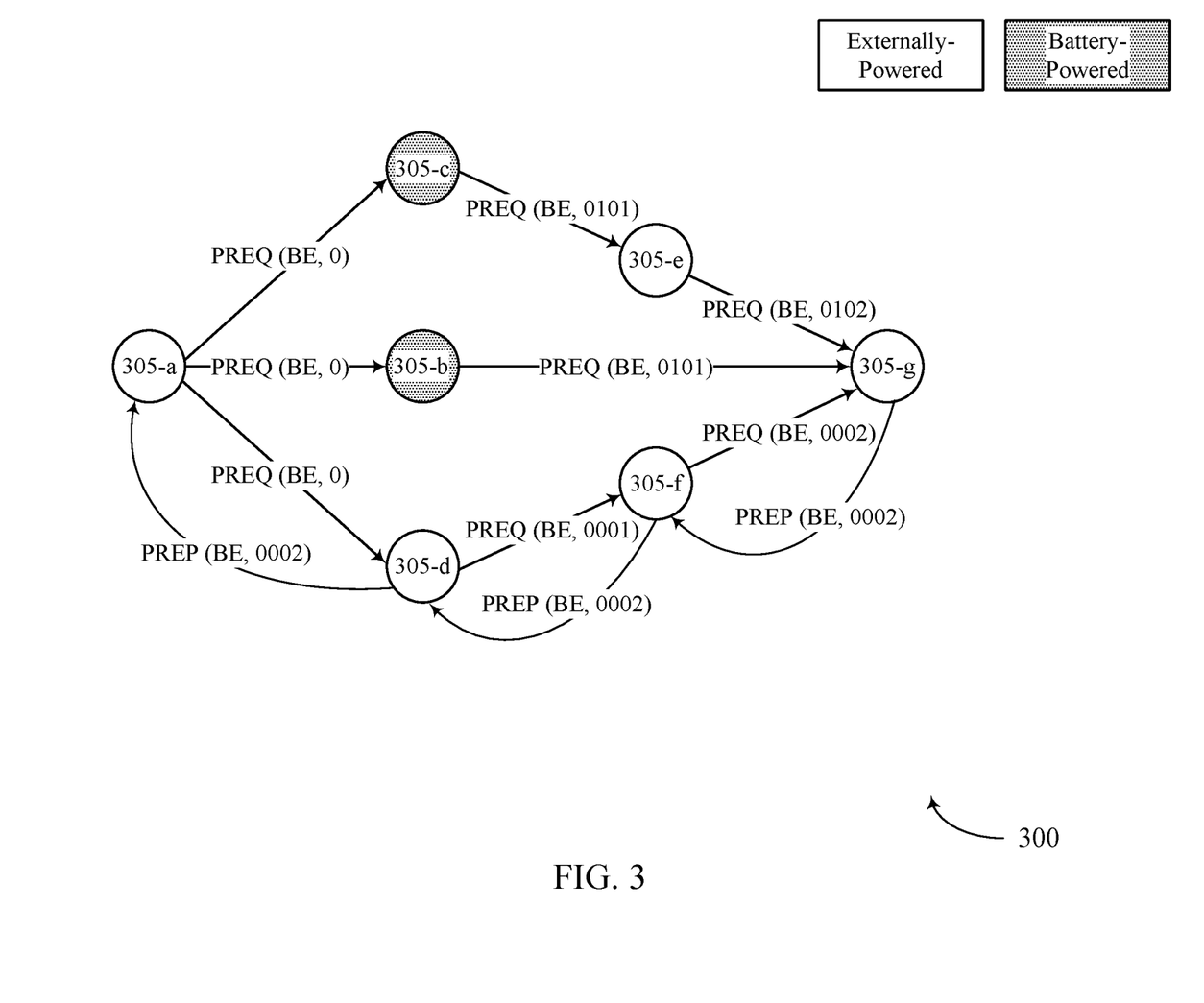
FIG. 3 illustrates a wireless communications system that supports battery efficient routing in accordance with aspects of the present disclosure.

FIG. 3 illustrates a wireless communications system 300 that supports battery efficient routing in accordance with aspects of the present disclosure. Wireless communications system 300 may be an example of a mesh network (e.g., a Bluetooth mesh network or other type of mesh network). Wireless communications system 300 may include multiple devices 305, which may be examples of the devices 205 described with reference to FIG. 2. The devices 305 may include a source device 305-*a*, a destination device 305-*g*, and intermediary devices 305-*b* through 305-*f*. The devices 305 may include externally-powered devices, shown in white, and battery-powered devices, shown in black.

To establish a relay path between source device 305-*a* and destination device 305-*g*, source device 305-*a* may transmit one or more messages, such as PREQ messages, to nearby devices. For example, source device 305-*a* may transmit a PREQ message to device 305-*b*, device 305-*c*, and device 305-*d*. The PREQ message may include several fields, including a path metric type field and path metric value fields. The path metric type field may indicate the type of path metric via one or more bits. For example, if the path metric field has the hexadecimal value 0x00 (i.e., binary 0), the path metric may be hop count. If the path metric field has the hexadecimal value 0x01 (i.e., binary 1), the path metric may be RSSI. If the path metric is 0x02 (i.e., binary 10), the path metric may be the battery metric BE. In the context of FIG. 3, the path metric type is BE. In some cases, multiple math metric types may be represented by a single path metric field (e.g., the value 0x03 may indicate BE and hop count).

The path metric fields may be represented by one or more information groups. In some examples, as described below these sets may be or include octets. Other information groups or organizations are also contemplated and within the scope of this disclosure. For example, the path metric field may include two octets. The first octet (e.g., the most significant bit (MSB)) may represent the path metric value for the chosen path metric type. And the second octet may represent another path metric value (e.g., for another chosen path metric type or for a default path metric type). In the context of FIG. 3, the first octet may represent the quantity of battery-powered devices associated with the path, which corresponds to the battery metric type BE. The second octet may represent the hop count associated with the path. Even though the metric type is BE, the devices 305 may still keep track of another metric (e.g., hop count) for tie-breaking purposes.

When source device 305-a transmits the PREQ message (s), the path metric field may have a value of zero (e.g., because no device is part of the path yet). But the path metric field may be updated to a non-zero value upon receipt at an intermediary device 305. For example, device 305-c may increment the values in both octets to indicate that the path formed by device 305-c includes one battery-powered device and one hop (e.g., one device). Similarly, device 305-b may increment the values in both octets to indicate that the path formed by device 305-b includes one battery-powered device and one hop (e.g., one device). However, device 305-d may only increment the second octet to indicate that the path formed by device 305-d includes zero battery-powered devices and one hop (e.g., one device).

Once each device has updated the path metric value(s), the device may forward the PREQ message to its neighboring device(s). Thus, device 305-c may forward the PREQ message with the path metric type BE and a path metric value of (0101) to device 305-e; device 305-b may forward the PREQ message with the path metric type BE and a path metric value of (0101) to device 305-g; and device 305-d may forward the PREQ message with the path metric type BE and a path metric value of (0001) to device 305-f.

Upon receipt of the PREQ message from device 305-c, device 305-e may increment the second octet but not the first octet to indicate that the path formed by device 305-e includes one battery-powered device and two hops (e.g., two devices). Upon receipt of the PREQ message from device 305-d, device 305-f may increment the second octet but not the first to indicate that the path formed by device 305-f includes zero battery-powered devices and two hops (e.g., two devices). Device 305-e and device 305-f may then forward the updated PREQ message to their respective neighbor devices. Thus, device 305-e may forward the PREQ message with path metric type BE and a path metric value of (0102) to destination device 305-g. And device 305-f may forward the PREQ message with path metric type BE and a path metric value of (0002) to destination device 305-g.

After receiving the PREQ messages from devices 305-b, 305-e, and 305-f, destination device 305-g may reference the PREQ messages to determine the path with the lowest quantity of battery-powered devices. Based on this determination, destination device 305-g may opt to send a PREP message to device 305-f (but not to device 305-b or 305-e). If the available paths include the same quantity of battery-powered devices, the destination device 305-g may select a path based on the second metric indicated by the PREQ messages. For example, if the example shown in FIG. 3 did not include the path formed by devices 305-d and 305-f, the destination device 305-g would select the path formed by device 305-b, because that path has the same quantity of battery-powered devices, but fewer hops, than the path formed by devices 305-c and 305-e. So in some cases (e.g., when the quantity of battery-powered devices is the same), path selection may be based on multiple path metrics.

With respect to the example shown in FIG. 3, destination device 305-g may transmit to device 305-f a PREP message that includes an indication of the path metric type and the path metric values associated with the selected path. The PREP message may be forwarded by device 305-f to device 305-d, then from device 305-d to source device 305-a. The path metric values may be stored by the source device 305-d for later reference (e.g., when determining whether to update or change relay paths). The source device 305-a may then transmit to device 305-d data intended for destination device 305-g. The data may be forwarded along the selected path until it reaches destination device 305-g.

Figure 4:
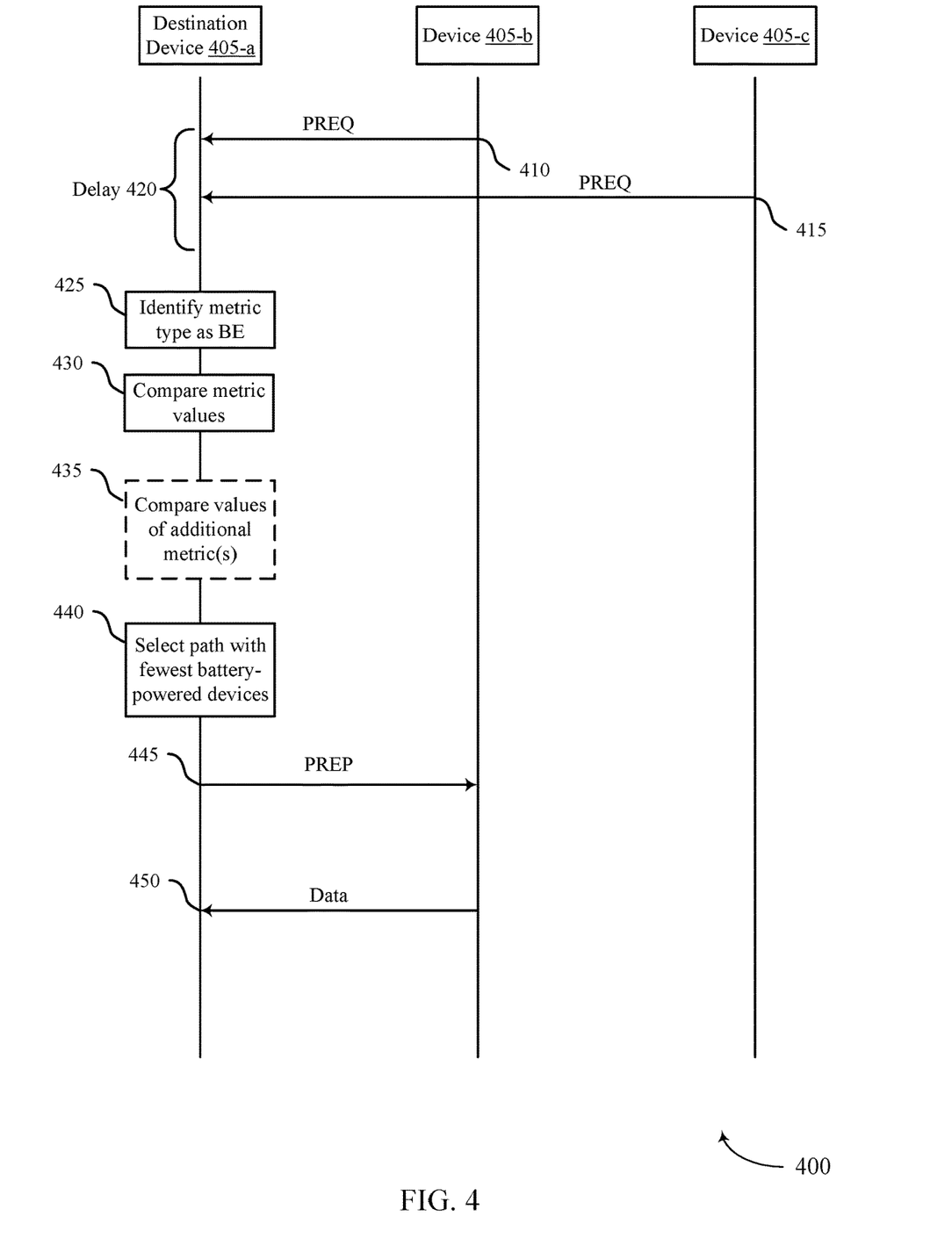
FIG. 4 illustrates a process flow that supports battery efficient routing in accordance with aspects of the present disclosure.

FIG. 4 illustrates a process flow 400 that supports battery efficient routing in accordance with aspects of the present disclosure. Process flow 400 may be an example of a process flow that occurs within a mesh network (e.g., a Bluetooth mesh network or other type of mesh network). The process flow 400 may be part of a process for setting up a relay within the mesh network. Aspects of process flow 400 may be implemented by one or more devices 405, which may be examples of the devices 205 and 305 described with reference to FIGS. 2 and 3, respectively. The devices 405 may include a destination device 405-a and intermediary devices 405-b and 405-c. The intermediary devices may each be part of different candidate paths through the mesh network.

At 410, the destination device 405-a may receive a first PREQ message from device 405-b. The first PREQ message may include a path metric type and one or more path metric values. At 415, the destination device 405-a may receive a second PREQ message from device 405-c. The second PREP message may include the path metric type and one or more path metric values. The first and second PREQ messages may be associated with the same source device. Upon receiving the first PREQ message, destination device 405-a may start a timer that represents delay 420. Destination device 405-a may refrain from responding to PREQ messages associated with the source device until after the delay 420. By implementing delay 420, destination device 405-a may increase the likelihood that it has received all relevant PREQ messages before selecting a path. Although shown with two PREQ messages from two intermediary devices, the relay path selection techniques described herein can be implemented using any quantity of message, including PREQ messages, from any quantity of devices, such as intermediary devices.

At 425, destination device 405-a may identify the metric type indicated by the first and second PREQ messages. For instance, destination device 405-a may identify the metric type as BE, which may indicate the metric of interest as battery-powered devices that relayed the PREQ message. At 430, destination device 405-a may compare the metric values indicated by the first and second PREQ messages (e.g., destination device 405-a may compare the quantity of battery-powered devices indicated by the first PREQ message to the quantity of battery-powered devices indicated by the second PREQ message). In some cases, destination device 405-a may, e.g., at 435, compare the values of additional metrics conveyed by the first and second PREQ messages. For instance, destination device 405-a may compare RSSI values, remaining power values, and/or hop count values. Destination device 405 may decide to compare the additional values based on the indicated path metric type, or based on the determination that the first metric values are equal.

At 440, destination device 405-a may select a path based on the comparison of the path metric values, among other factors. For example, the destination device 405-a may select the path associated with the lowest quantity of battery-powered devices. If the available paths have the same quantity of battery-powered devices, the destination device 405-a may select the path associated with the highest RSSI value, highest remaining power value, or lowest hop count.

At 445, destination device 405-a may send a PREP message to the intermediary device associated with the path with the lowest quantity of battery-operated devices (e.g., destination device 405-a may send a PREP message to the intermediary device that send the PREQ message with the lowest BE metric value). For instance, if the BE metric value of the first PREQ message (from intermediary device 405-b) is three and the BE metric value of the second PREQ message (from intermediary device 405-c) is four, destination device 405-a may transmit a PREP message to device 405-b. The PREP message may be in respond to the first PREQ message and may indicate the path metric type as well as the path metric value.

At 450, destination device 405-a may receive data from intermediary device 405-b. The data may be relayed by the intermediary device 405-b based on the intermediary device 405-a receiving the PREP message at 445. The data may be from a source device out of range of, or otherwise prohibited from transmitting to, destination device 405-a.

Figure 5:
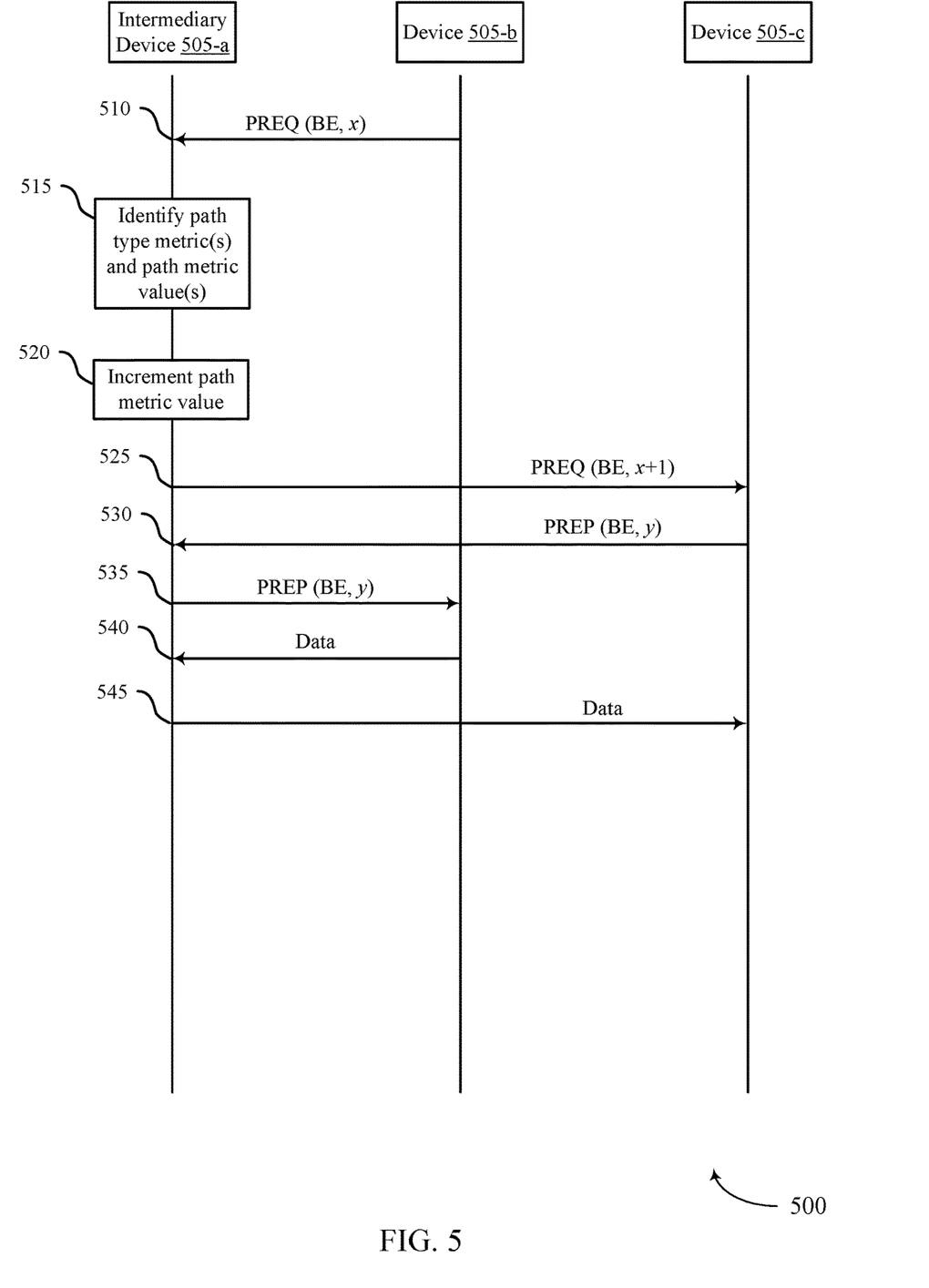
FIG. 5 illustrates a process flow that supports battery efficient routing in accordance with aspects of the present disclosure.

FIG. 5 illustrates a process flow 500 that supports battery efficient routing in accordance with aspects of the present disclosure. Process flow 500 may be an example of a process flow that occurs within a mesh network (e.g., a Bluetooth mesh network or other type of mesh network). The process flow 500 may be part of a process for setting up a relay within the mesh network. Aspects of process flow 500 may be implemented by one or more devices 505, which may be examples of the devices 205 and 305 described with reference to FIGS. 2 and 3, respectively. The devices 505 may include an intermediary device 505-a and devices 505-b and 505-c. Device 505-b may be a source device or an intermediary device, and device 505-c may be an intermediary device or a destination device. Intermediary device 505-a may be a battery-powered device.

At 510, intermediary device 505-a may receive a first PREQ message from device 505-b. The first PREQ message may include a path metric type (e.g., BE) and a path metric value a BE value x). At 515, intermediary device 505-a may identify the path metric type as well as the path metric value. At 520, intermediary device 505-a may adjust (e.g., increment) the path metric value based on the path metric type and based on the intermediary device 505-a being a battery-powered device. In some cases, intermediary device 505-a may adjust multiple path metric values (e.g., intermediary device 505-a may adjust the RSSI value, hop count value, or remaining power value). At 525, intermediary device 505-a may forward the PREQ message with the path metric type and the adjusted path metric value(s) to device 505-c.

At 530, intermediary device 505-a may receive a PREP message from device 505-c. The PREP message may include the path metric type and/or the an updated path metric value(s), The updated path metric value(s) may be the value(s) intermediary device 505-a sent in the PREQ message at 525 (e.g., y=x+1) or different path metric value(s). At 535, intermediary device 505-a may forward the PREP message (e.g., without modifying the path metric values) to device 505-b. At 540, intermediary device 505-a may receive data from device 505-b, and at 545 intermediary device 505-a may forward the data to device 505-c.

Although shown from the perspective of a destination device, the path selection techniques described herein may be implemented by or also relate to a source device. In such cases, the source device may select the path based on metric values included in one or more PREP messages that may be received by the source device.

Figure 6:
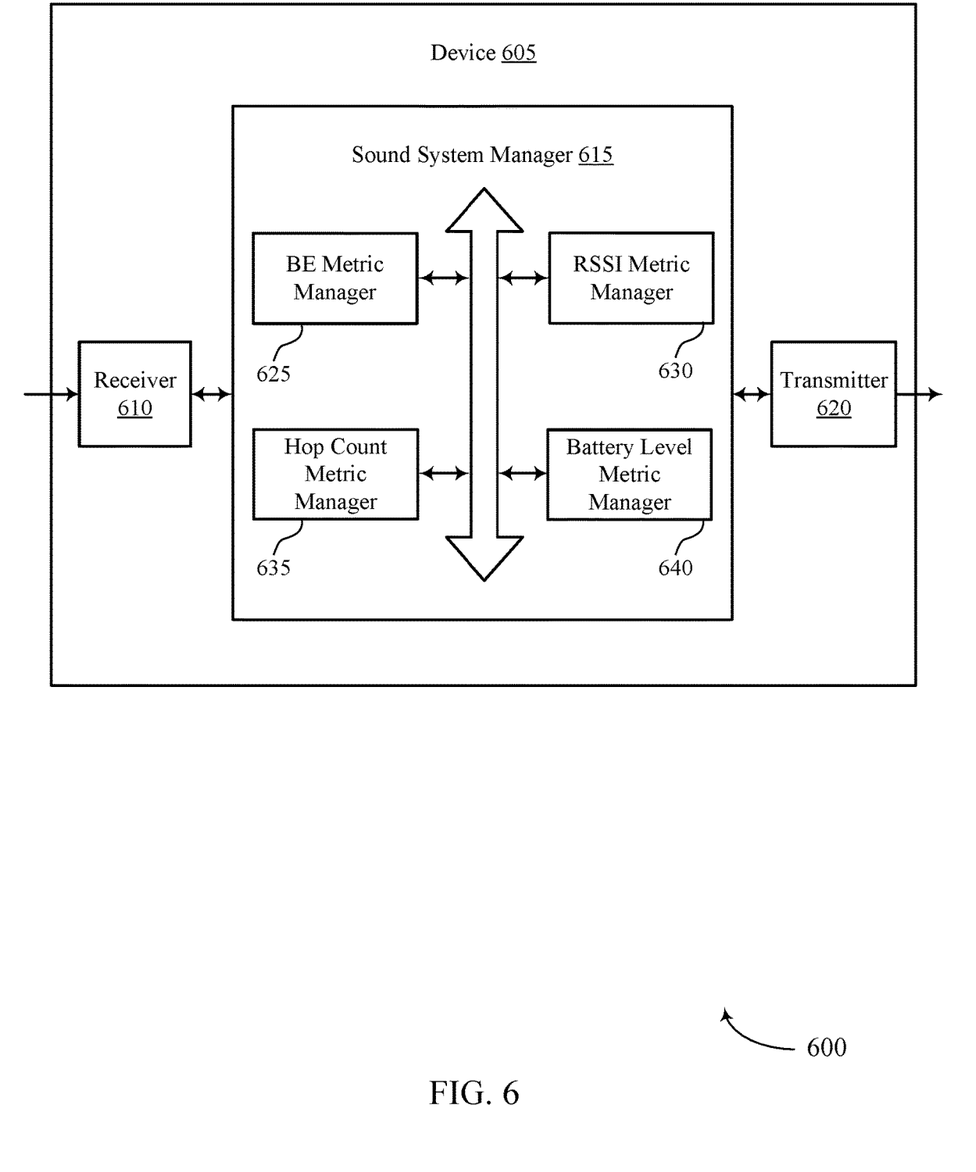
FIG. 6 shows a block diagram of a device that supports battery efficient routing in accordance with aspects of the present disclosure.

FIG. 6 shows a block diagram 600 of a device 605 that supports battery efficient routing in accordance with aspects of the present disclosure. The device 605 may include a receiver 610, a relay path manager 615, and a transmitter 620. The device 605 may also include a processor. Each of these components may be in communication with one another (e.g., via one or more buses). The device 605 may be a first wireless device within a mesh network.

Receiver 610 may receive information such as messages (e.g., PREQ and PREP messages), packets, user data, or control information associated with various information channels (e.g., control channels, data channels, and information related to relay path formation and selection). Information may be passed on to other components of the device 605. The receiver 610 may be an example of aspects of the transceiver 720 described with reference to FIG. 7. The receiver 610 may utilize a single antenna or a set of antennas.

Transmitter 620 may transmit signals generated by other components of the device 605. For example, the transmitter 620 may transmit PREQ and PREP messages. In some examples, the transmitter 620 may be collocated with a 610 in a transceiver module. For example, the transmitter 620 may be an example of aspects of the transceiver 720 described with reference to FIG. 7. The transmitter 620 may utilize a single antenna or a set of antennas.

In some examples, the receiver 610 may receive messages from wireless devices within the wireless mesh network. Each of the messages may include a value indicating a quantity of wireless devices that relayed the message while operating using a respective battery source (e.g., each message may include a BE path metric value). In such cases, the BE metric manager 625 may determine, based at least in part on the messages, that a second wireless device transmitted a first message with a value that corresponds to the lowest quantity of wireless devices that relayed that message while operating using the respective battery source. The transmitter 620 may transmit a second message over a path that includes the second wireless device based at least in part on the determination.

In some cases, the BE metric manager 625 may determine, based at least in part on an indication in the first message (e.g., the path metric type), that the value of the first message indicates the quantity of wireless devices using the respective battery source. For example, the BE metric manager 625 may determine based on the path metric type that the path metric value corresponds to the quantity of battery-powered devices that form the path.

In some cases (e.g., when the device 605 is a destination device), the messages from the plurality of wireless devices are PREQ messages and the second message is a PREP message. In such cases, the receiver 610 may receive data from the second wireless device based at least in part on sending the PREP message to the second wireless device. The data may originate from a wireless device other than the second wireless device (e.g., the data may originate from a source device).

In some cases (e.g., when the device 605 is an intermediary device), the first message is a PREQ message. In such cases, the BE metric manager 625 may increment the value of the first message and the transmitter 620 may forward the PREQ message with the incremented value to a third wireless device. The receiver 610 may receive a first PREP message from the third wireless device. In these cases, transmitting the second message may include forwarding the first PREP message.

In some cases, the BE metric manager 625 may determine that a third message from a third wireless device of the wireless devices includes the value that corresponds to the lowest quantity of wireless devices that relayed the third message while operating using the respective battery source. For example, the BE metric manager 625 may determine that 1) the first and third messages are PREQ messages that have the same BE path metric value and 2) the BE path metric value corresponds to the lowest quantity of battery-powered devices. In such cases, the RSSI metric manager 630, the hop count metric manager 635, or the battery level metric manager 640 may compare a second metric of the first and third messages. The second metric may be indicative of a total quantity of wireless devices, an RSSI, or a level of battery power.

In some cases, the hop count metric manager may 635 may determine, based at least in part on the first message, a quantity of wireless devices that are part of the path (e.g., the hop count metric manager 635 may determine the hop count associated with the path). In such cases, the second message may be transmitted over the path (e.g., to the second wireless device) based at least in part on the quantity of devices that are part of the path (e.g., based on the hop count).

In some examples, the RSSI metric manager 630 may determine, based at least in part on the first message, an RSSI associated with the path. In such cases, the second message may be transmitted over the path based at least in part on the RSSI.

In some examples, the battery level metric manager 640 may determine, based at least in part on the first message, a level of battery power for a quantity of wireless devices that are part of the path. In such cases, the second message may be transmitted over the path based at least in part on the level.

Figure 7:
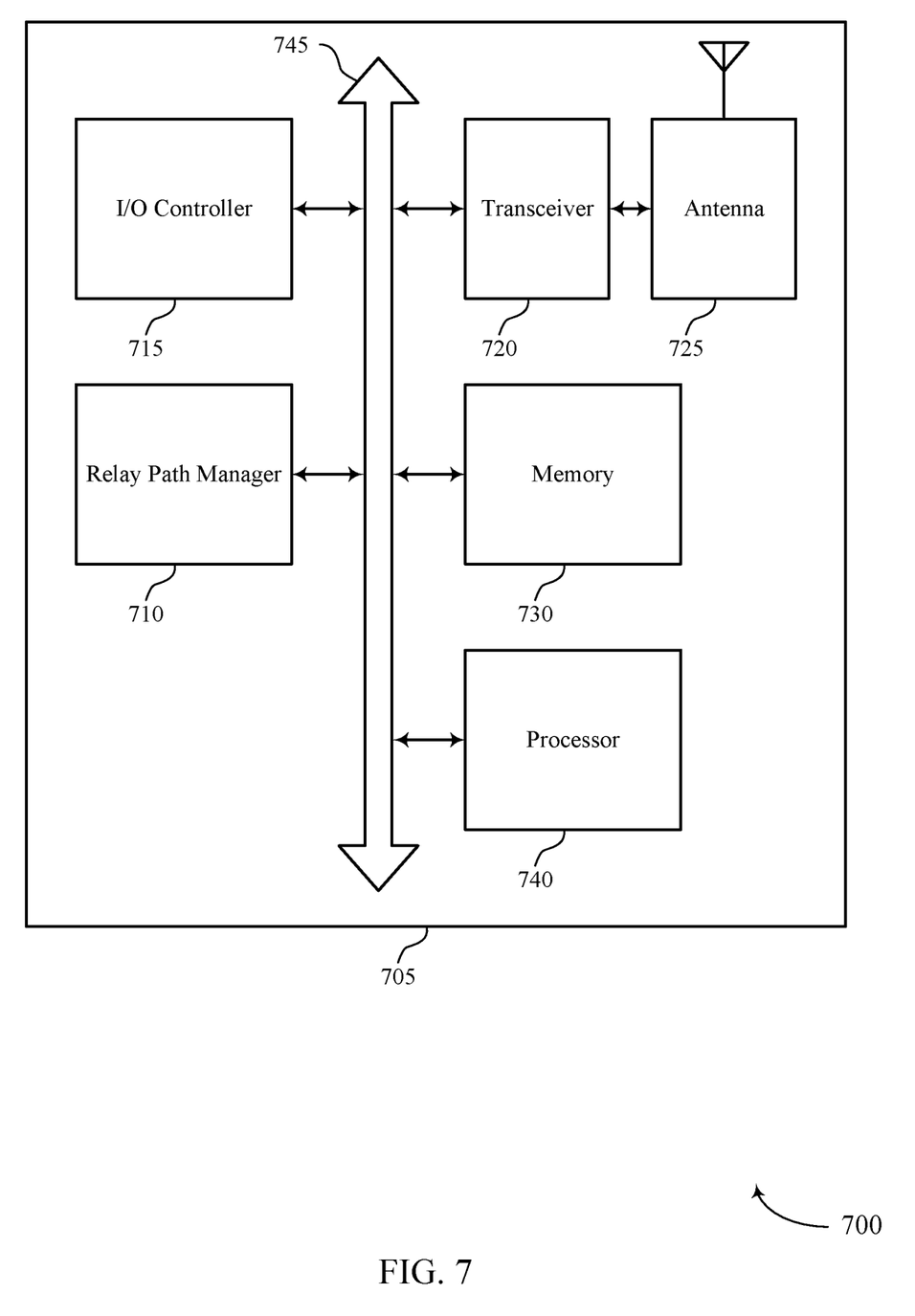
FIG. 7 shows a diagram of a system including a device that supports battery efficient routing based on tracked position in accordance with aspects of the present disclosure.

FIG. 7 shows a diagram of a system 700 including a device 705 that supports battery efficient routing based on tracked position in accordance with aspects of the present disclosure. The device 705 may be an example of the devices 115, 205, 305, 405, 505, and 705 as described herein. The device 705 may include components for bi-directional voice and data communications including components for transmitting and receiving communications, including a relay path manager 710, an I/O controller 715, a transceiver 720, an antenna 725, memory 730, and a processor 740. These components may be in electronic communication via one or more buses (e.g., bus 745).

The relay path manager 710 receive messages from wireless devices within the same wireless mesh network as device 705. Each message may include a value indicating the quantity of wireless devices that relayed the message while operating using a respective battery source. The relay path manager 710 may determine, based at least in part on the messages, that a second wireless device transmitted a first message with a value that corresponds to the lowest quantity of wireless devices that relayed that message while operating using the respective battery source. And the relay path manager may transmit a second message over a path that includes the second wireless device based at least in part on the determination.

I/O controller 715 may manage input and output signals for device 705. I/O controller 715 may also manage peripherals not integrated into device 705. In some cases, I/O controller 715 may represent a physical connection or port to an external peripheral. In some cases, I/O controller 715 may utilize an operating system such as iOS®, ANDROID®, MS-DOS®, MS-WINDOWS®, OS/2®, UNIX®, LINUX®, or another known operating system. In other cases, I/O controller 715 may represent or interact with a modem, a keyboard, a mouse, a touchscreen, or a similar device. In some cases, I/O controller 715 may be implemented as part of a processor. In some cases, a user may interact with device 705 via I/O controller 715 or via hardware components controlled by I/O controller 715.

Transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas 725.

In some cases, the device 705 may include a single antenna 725. However, in some cases the device may have more than one antenna 725, which may be capable of concurrently transmitting or receiving multiple wireless transmissions.

Memory 730 may include RAM and ROM. The memory 730 may store computer-readable, computer-executable software including instructions that, when executed, cause the processor to perform various functions described herein. In some cases, the memory 730 may contain, among other things, a BIOS which may control basic hardware or software operation such as the interaction with peripheral components or devices.

Processor 740 may include an intelligent hardware device, (e.g., a general-purpose processor, a CPU, a microcontroller, an ASIC, an FPGA, a programmable logic device, a discrete gate or transistor logic component, a discrete hardware component, or any combination thereof). In some cases, processor 740 may be configured to operate a memory array using a memory controller. In other cases, a memory controller may be integrated into processor 740. Processor 740 may be configured to execute computer-readable instructions stored in a memory to perform various functions (e.g., functions or tasks supporting the formation and selection of a battery-efficient relay path).

Figure 8:
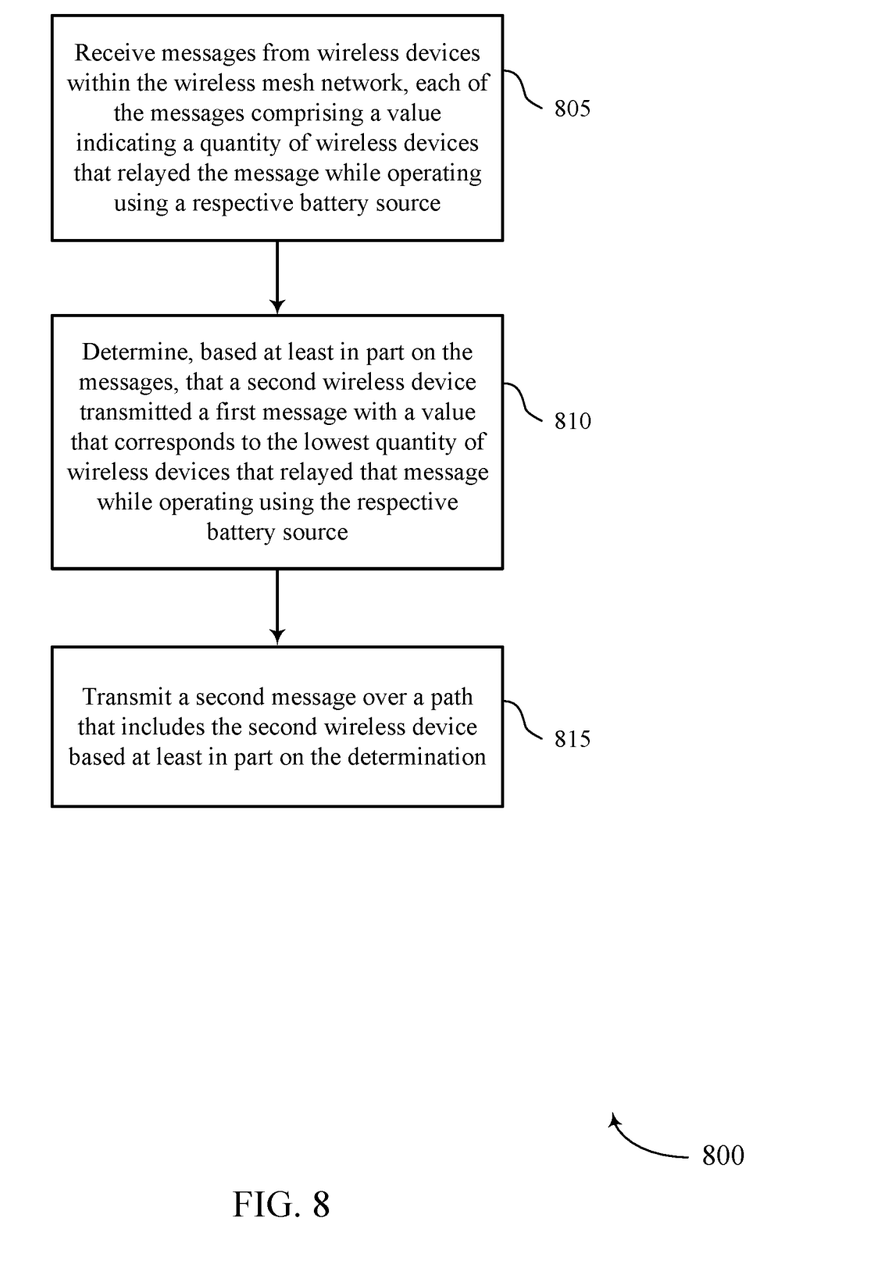
FIG. 8 shows a flowchart illustrating a method that supports battery efficient routing in accordance with aspects of the present disclosure.

FIG. 8 shows a flowchart illustrating a method 800 that supports battery efficient routing in accordance with aspects of the present disclosure. The operations of method 800 may be implemented by a device or its components as described herein. For example, the operations of method 800 may be performed by a relay path manager as described with reference to FIGS. 6 and 7. In some examples, a device may execute a set of instructions to control the functional elements of the device to perform the functions described below. Additionally or alternatively, a device may perform aspects of the functions described below using special-purpose hardware. The device may be a first wireless device in a wireless mesh network.

At 805, the method may include receiving messages from wireless devices within the wireless mesh network, each of the messages comprising a value indicating a quantity of wireless devices that relayed the message while operating using a respective battery source. The operations of 805 may be performed according to the methods described herein. In some examples, aspects of the operations of 805 may be performed by a receiver 610 as described with reference to FIG. 6.

At 810, the method may include determining, based at least in part on the messages, that a second wireless device transmitted a first message with a value that corresponds to the lowest quantity of wireless devices that relayed that message while operating using the respective battery source. The operations of 810 may be performed according to the methods described herein. In some examples, aspects of the operations of 810 may be performed by a BE metric manager 625 as described with reference to FIG. 6.

At 815, the method may include transmitting a second message over a path that includes the second wireless device based at least in part on the determination. The operations of 815 may be performed according to the methods described herein. In some examples, aspects of the operations of 815 may be performed by a transmitter 620 as described with reference to FIG. 6.

It should be noted that the method described above describes possible implementations, and that the operations and the steps may be rearranged or otherwise modified and that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 of FIG. 1—may include one or more carriers, where each carrier may be a signal made up of multiple sub-carriers waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples" The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device in a wireless mesh network, comprising:
   receiving messages from wireless devices within the wireless mesh network, each of the messages indicating a quantity of wireless devices that relayed the message while operating using a respective battery source, and each of the messages indicating an average battery level for the quantity of wireless devices;
   determining, based at least in part on the messages, that a second wireless device and a third wireless device each transmitted a respective message indicating the lowest quantity of wireless devices that relayed that message while operating using the respective battery source;
   determining, based at least in part on determining that the second wireless device and the third wireless device each transmitted a respective message indicating the lowest quantity, that the message transmitted by the second wireless device indicates a higher average battery level than an average battery level indicated by the message transmitted by the third wireless device; and
   transmitting a reply message over a path that includes the second wireless device based at least in part on determining that the message transmitted by the second wireless device indicates a higher average battery level than the average battery level indicated by the message transmitted by the third wireless device.

2. The method of claim 1, further comprising:
   determining, based at least in part on the message from the second wireless device, a quantity of wireless devices that are part of the path, wherein the reply message is transmitted over the path based at least in part on the quantity of wireless devices that are part of the path.

3. The method of claim 1, further comprising:
   determining, based at least in part on the message from the second wireless device, a received signal strength indicator (RSSI) associated with the path, wherein the reply message is transmitted over the path based at least in part on the RSSI.

4. The method of claim 1, further comprising:
   determining, based at least in part on the message from the second wireless device, a level of battery power for a quantity of wireless devices that are part of the path, wherein the reply message is transmitted over the path based at least in part on the level.

5. The method of claim 1, further comprising:
   comparing a metric of the messages from the second wireless device and the third wireless device, the metric indicative of a total quantity of wireless devices, a received signal strength indicator (RSSI), or a level of battery power, or any combination thereof; and
   selecting the path for transmission of the reply message based at least in part on the comparison.

6. The method of claim 1, wherein the message from the second wireless device comprises a path request (PREQ) message, the method further comprising:
   incrementing a value of the PREQ message, the value indicating the quantity of wireless devices that relayed the PREQ message while operating using a respective battery source;
   forwarding the PREQ message with the incremented value to a fourth wireless device; and
   receiving a first path reply (PREP) message from the fourth wireless device, wherein transmitting the reply message comprises transmitting a second PREP message by forwarding the first PREP message.

7. The method of claim 1, wherein the messages comprise path request (PREQ) messages and wherein the reply message comprises a path reply (PREP) message.

8. The method of claim 7, further comprising:
   receiving data from the second wireless device based at least in part on sending the PREP message to the second wireless device, wherein the data originates from a wireless device other than the second wireless device.

9. The method of claim 1, further comprising:
   determining that a value of the message from the second wireless device indicates the quantity of wireless devices using the respective battery source based at least in part on an indication in the message from the second wireless device.

10. A first wireless device for wireless communication in a wireless mesh network, comprising:
    a processor;
    memory in electronic communication with the processor; and
    instructions stored in the memory and executable by the processor to cause the first wireless device to:
    receive messages from wireless devices within the wireless mesh network, each of the messages indicating a quantity of wireless devices that relayed the message while operating using a respective battery source, and each of the messages indicating an average battery level for the quantity of wireless devices;
    determine, based at least in part on the messages, that a second wireless device and a third wireless device each transmitted respective message indicating the lowest quantity of wireless devices that relayed that message while operating using the respective battery source;
    determining, based at least in part on determining that the second wireless device and the third wireless device each transmitted a respective message indicating the lowest quantity, that the message transmitted by the second wireless device indicates a higher average battery level than an average battery level indicated by the message transmitted by the third wireless device; and transmit a reply message over a path that includes the second wireless device based at least in part on determining that the message transmitted by the second wireless device indicates a higher average battery level than the average battery level indicated by the message transmitted by the third wireless device.

11. The first wireless device of claim 10, further comprising instructions executable by the processor to cause the first wireless device to:

determine, based at least in part on the message from the second wireless device, a quantity of wireless devices that are part of the path, wherein the reply message is transmitted over the path based at least in part on the quantity of wireless devices that are part of the path.

12. The first wireless device of claim 10, further comprising instructions executable by the processor to cause the first wireless device to:

determine, based at least in part on the message from the second wireless device, a received signal strength indicator (RSSI) associated with the path, wherein the reply message is transmitted over the path based at least in part on the RSSI.

13. The first wireless device of claim 10, further comprising instructions executable by the processor to cause the first wireless device to:

determine, based at least in part on the message from the second wireless device, a level of battery power for a quantity of wireless devices that are part of the path, wherein the reply message is transmitted over the path based at least in part on the level.

14. The first wireless device of claim 10, further comprising instructions executable by the processor to cause the first wireless device to:

compare a metric of the messages from the second wireless device and the third wireless device, the metric indicative of a total quantity of wireless devices, a received signal strength indicator (RSSI), or a level of battery power, or any combination thereof; and select the path for transmission of the reply message based at least in part on the comparison.

15. The first wireless device of claim 10, wherein the message from the second wireless device comprises a path request (PREQ) message, and wherein the first wireless device further comprises instructions executable by the processor to cause the first wireless device to:

increment a value of the PREQ message, the value indicating the quantity of wireless devices that relayed the PREQ message while operating using a respective battery source;

forward the PREQ message with the incremented value to a fourth wireless device; and receive a first path reply (PREP) message from the fourth wireless device, wherein transmitting the reply message comprises transmitting a second PREP message by forwarding the first PREP message.

16. The first wireless device of claim 10, wherein the messages comprise path request (PREQ) messages and wherein the reply message comprises a path reply (PREP) message.

17. The first wireless device of claim 16, further comprising instructions executable by the processor to cause the first wireless device to:

receive data from the second wireless device based at least in part on sending the PREP message to the second wireless device, wherein the data originates from a wireless device other than the second wireless device.

18. The first wireless device of claim 10, further comprising instructions executable by the processor to cause the first wireless device to:

determine that a value of the message from the second wireless device indicates the quantity of wireless devices using the respective battery source based at least in part on an indication in the message from the second wireless device.

19. A non-transitory computer readable medium storing code comprising instructions executable by a processor to cause a first wireless device in a wireless mesh network to:

receive messages from wireless devices within the wireless mesh network, each of the messages indicating a quantity of wireless devices that relayed the message while operating using a respective battery source, and each of the messages indicating an average battery level for the quantity of wireless devices;

determine, based at least in part on the messages, that a second wireless device and a third wireless device each transmitted a respective message indicating the lowest quantity of wireless devices that relayed that message while operating using the respective battery source;

determine, based at least in part on determining that the second wireless device and the third wireless device each transmitted a respective message indicating the lowest quantity, that the message transmitted by the second wireless device indicates a higher average battery level than an average battery level indicated by the message transmitted by the third wireless device; and transmit a reply message over a path that includes the second wireless device based at least in part on determining that the message transmitted by the second wireless device indicates a higher average battery level than the average battery level indicated by the message transmitted by the third wireless device.

20. The non-transitory computer readable medium of claim 19, further comprising instructions executable by the processor to cause the first wireless device to:

determine, based at least in part on the message from the second wireless device, a quantity of wireless devices that are part of the path, wherein the reply message is transmitted over the path based at least in part on the quantity of wireless devices that are part of the path.

* * * * *